(No Model.)

J. JONSON.
ANTI FRICTION BEARING FOR WRINGING MACHINES.

No. 286,618. Patented Oct. 16, 1883.

WITNESSES:
Fred. G. Dieterich,
Bennett S. Jones

Josiah Jonson
INVENTOR.
By William Johns Jr.
Louis Bagger & Co.
ATTORNEYS.

UNITED STATES PATENT OFFICE.

JOSIAH JONSON, OF TOLEDO, OHIO.

ANTI-FRICTION BEARING FOR WRINGING-MACHINES.

SPECIFICATION forming part of Letters Patent No. 286,618, dated October 16, 1883.

Application filed August 16, 1883. (No model.)

*To all whom it may concern:*

Be it known that I, JOSIAH JONSON, a citizen of the United States, and a resident of Toledo, in the county of Lucas and State of Ohio, have invented certain new and useful Improvements in Anti-Friction Bearings for Wringing-Machines; and I do hereby declare that the following is a full, clear, and exact description of the invention, which will enable others skilled in the art to which it appertains to make and use the same, reference being had to the accompanying drawings, which form a part of this specification, and in which—

Figure 1:
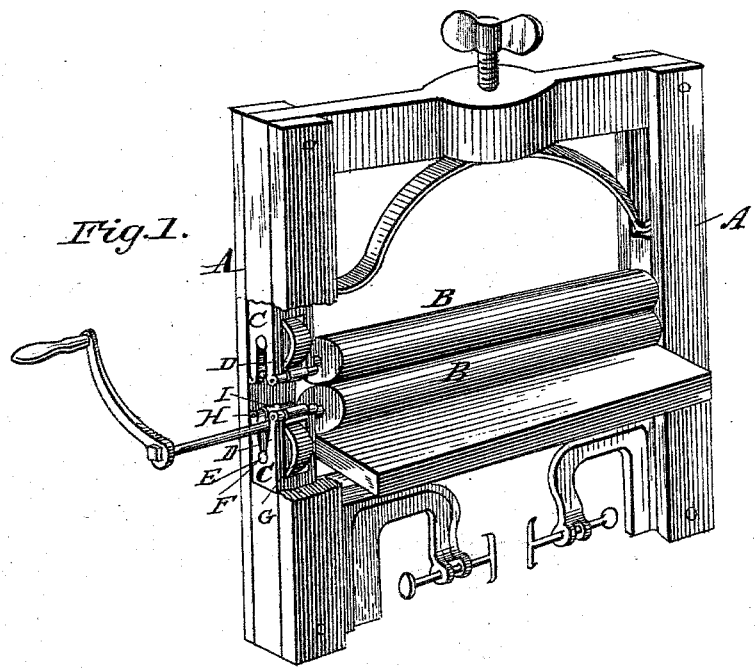
Figure 2:
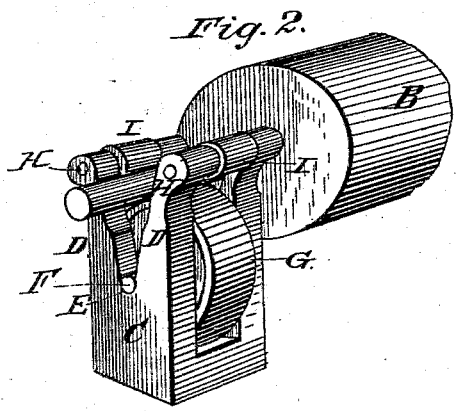
Figure 3:
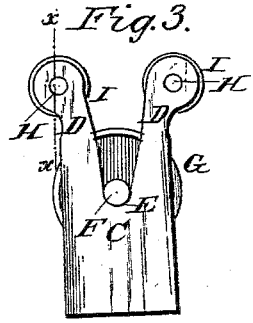
Figure 4:
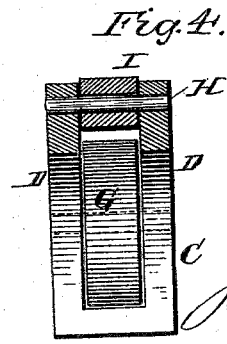

Figure 1 is a perspective view of a wringing-machine, the frame of which is partly broken away to show the anti-friction bearings. Fig. 2 is a perspective view of the bearing, with one end of one of the rollers. Fig. 3 is a side view of the bearing; and Fig. 4 is a sectional view on line *x x*, Fig. 3.

Similar letters of reference indicate corresponding parts in all the figures.

My invention has relation to that class of anti-friction bearings having a large roller and two small rollers bearing against the shaft, all three rollers being arranged to bear against points upon one-half of the surface of the shaft at one time; and it consists in the improved construction and combination of parts of such a bearing, especially adapted for wringing-machines, in which wear may be taken up as the parts of the same are worn out, as hereinafter more fully described and claimed.

In the accompanying drawings, the letter A indicates the frame of a wringing-machine, and B the rollers. The ends of the shafts of these rollers turn in bearings consisting of a box, C, having four arms, D, diverging in pairs to the open sides of the box, forming bearings E in the forks of the closed sides of the box, in which a journal, F, turns, upon which a large friction-roller, G, is fastened. The outer ends of each of the divergent pairs of arms are connected by a pin, H, upon which a small roller, I, is journaled, the two rollers projecting slightly out over the sides of the larger roller. The shafts of the wringing-rollers are inserted between the divergent arms of the bearings, bearing against the rim of the larger friction-rollers and being guided by the smaller rollers at the sides; and it will be seen that the shafts of the wringing-roller will cause the journal of the latter to wear the bearing in the fork of the divergent arms, and that, the said bearing being open at the top, the roller and journal may be raised a distance out of the bearing, leaving space for a curved metal plate or similar piece of metal to be inserted to take up the wear in the bearing, thus always keeping the larger roller in the same relative position to the smaller ones when the bearing is kept lined when worn out.

I am aware that anti-friction bearings have been made, as stated in the statement of the invention, in which the revolving shaft rests upon the rim of a larger roller, while two guide-rollers, one upon each side, support the shaft laterally, and I do not wish to claim such construction; but

What I claim, and desire to secure by Letters Patent of the United States, is—

An anti-friction roller-bearing consisting of a box having two divergent pairs of arms, forming forked bearings in the opposite closed sides of the box, and having a large anti-friction roller journaled in the said bearing and two smaller rollers journaled between each divergent pair of arms, as and for the purpose shown and set forth.

In testimony that I claim the foregoing as my own I have hereunto affixed my signature in presence of two witnesses.

JOSIAH JONSON.

Witnesses:
WILLIAM JOHNS, Jr.,
CHARLES I. SCOTT.